(12) United States Patent
Shmukler et al.

(10) Patent No.: US 12,137,331 B2
(45) Date of Patent: *Nov. 5, 2024

(54) USING AUXILIARY DEVICE CASE FOR TRANSLATION

(71) Applicant: Google LLC, Mountain View, CA (US)

(72) Inventors: Maksim Shmukler, San Jose, CA (US); Adam Champy, Palo Alto, CA (US); Dmitry Svetlov, San Jose, CA (US); Jeffrey Kuramoto, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/145,695

(22) Filed: Dec. 22, 2022

(65) Prior Publication Data

US 2023/0188894 A1 Jun. 15, 2023

Related U.S. Application Data

(63) Continuation of application No. 16/237,947, filed on Jan. 2, 2019, now Pat. No. 11,540,054.

(Continued)

(51) Int. Cl.
 *H04R 5/033* (2006.01)
 *G06F 3/16* (2006.01)
 (Continued)

(52) U.S. Cl.
 CPC .............. *H04R 5/033* (2013.01); *G06F 3/16* (2013.01); *G06F 40/58* (2020.01);
 (Continued)

(58) Field of Classification Search
 CPC .............................. H04R 1/1025; H04R 1/10
 See application file for complete search history.

(56) References Cited

U.S. PATENT DOCUMENTS

| 11,540,054 B2 | 12/2022 | Shmukler et al. |
| 2010/0235161 A1 | 9/2010 | Kim et al. |

(Continued)

FOREIGN PATENT DOCUMENTS

| CN | 103078365 | 5/2013 |
| CN | 204967335 | 1/2016 |

(Continued)

OTHER PUBLICATIONS

"Foreign Office Action", CN Application No. 201980006517.2, Apr. 22, 2023, 29 pages.

(Continued)

*Primary Examiner* — Thomas H Maung
(74) *Attorney, Agent, or Firm* — Colby Nipper PLLC (57) ABSTRACT

An auxiliary device charging case is used to facilitate translation features of a mobile computing device or auxiliary device. A first user, who may be a foreign language speaker, holds the charging case and speaks into the charging case. The charging case communicates the received speech to the mobile computing device, either directly or through the auxiliary device, which translates the received speech into a second language for a second user, who is the owner of the mobile computing device and auxiliary device. The second user may provide input in the second language, such as by speaking or typing into the auxiliary or mobile computing device. The mobile computing device may translate this second input to the first language, and transmit the translated input to the charging case either directly or through the auxiliary device. The charging case may output the translated second input to the first user, such as through a speaker or display screen.

17 Claims, 7 Drawing Sheets

Related U.S. Application Data (60) Provisional application No. 62/613,210, filed on Jan. 3, 2018.

(51) Int. Cl.
    *G06F 40/58*     (2020.01)
    *H04M 1/72412*     (2021.01)
    *H04R 1/10*     (2006.01)
    *H04W 4/80*     (2018.01)
    *H04M 1/60*     (2006.01)

(52) U.S. Cl.
CPC ...... *H04M 1/72412* (2021.01); *H04R 1/1025* (2013.01); *H04R 1/1041* (2013.01); *H04W 4/80* (2018.02); *H04M 1/6041* (2013.01); *H04M 2250/58* (2013.01); *H04M 2250/74* (2013.01); *H04R 1/1016* (2013.01); *H04R 2201/107* (2013.01); *H04R 2460/17* (2013.01)

(56) References Cited

U.S. PATENT DOCUMENTS

| | | | |
|---|---|---|---|
| 2012/0035907 A1 | 2/2012 | Lebeau et al. | |
| 2012/0215519 A1 | 8/2012 | Park et al. | |
| 2013/0094687 A1 | 4/2013 | Weinstein et al. | |
| 2014/0350943 A1 | 11/2014 | Goldstein | |
| 2015/0039303 A1 | 2/2015 | Lesso et al. | |
| 2015/0058023 A1 | 2/2015 | Goo | |
| 2015/0156531 A1 | 6/2015 | Atsmon | |
| 2015/0382106 A1 | 12/2015 | Kraft et al. | |
| 2016/0283469 A1 | 9/2016 | Gold | |
| 2016/0360350 A1 | 12/2016 | Watson et al. | |
| 2017/0060850 A1 | 3/2017 | Lewis et al. | |
| 2018/0131793 A1* | 5/2018 | Kim | H04M 1/72412 |
| 2018/0260388 A1 | 9/2018 | Huang et al. | |
| 2018/0270175 A1 | 9/2018 | Kim | |
| 2018/0301135 A1 | 10/2018 | Yamabe et al. | |
| 2018/0322116 A1 | 11/2018 | Huang et al. | |
| 2018/0329896 A1* | 11/2018 | Goethals | G10L 13/00 |
| 2019/0208324 A1 | 7/2019 | Shmukler et al. | |
| 2020/0134026 A1 | 4/2020 | Lovitt et al. | |
| 2020/0204898 A1 | 6/2020 | Schoeck et al. | |

FOREIGN PATENT DOCUMENTS

| | | |
|---|---|---|
| CN | 205139917 | 4/2016 |
| CN | 206117937 | 4/2017 |
| CN | 107333200 | 11/2017 |
| CN | 107333201 | 11/2017 |
| WO | 2016161454 | 10/2016 |

OTHER PUBLICATIONS

"Advisory Action", U.S. Appl. No. 16/237,947, May 7, 2021, 2 pages.

"Final Office Action", U.S. Appl. No. 16/237,947, Feb. 9, 2022, 16 pages.

"Final Office Action", U.S. Appl. No. 16/237,947, Feb. 11, 2021, 23 pages.

"International Preliminary Report on Patentability", Application No. PCT/US2019/012053, Jul. 16, 2020, 8 pages.

"International Search Report and Written Opinion", Application No. PCT/US2019/012053, Apr. 2, 2019, 13 pages.

"Non-Final Office Action", U.S. Appl. No. 16/237,947, Jul. 14, 2020, 15 pages.

"Non-Final Office Action", U.S. Appl. No. 16/237,947, Jul. 30, 2021, 14 pages.

"Notice of Allowance", U.S. Appl. No. 16/237,947, Aug. 25, 2022, 5 pages.

"Foreign Office Action", CN Application No. 201980006517.2, Dec. 28, 2022, 30 pages.

* cited by examiner

USING AUXILIARY DEVICE CASE FOR TRANSLATION

CROSS-REFERENCE TO RELATED APPLICATIONS

This application is a continuation of and claims priority to U.S. Non-Provisional patent application Ser. No. 16/237,947, filed on Jan. 2, 2019, which in turn claims the benefit of U.S. Provisional Patent Application Ser. No. 62/613,210, filed on Jan. 3, 2018, the disclosures of which are incorporated by reference herein in their entireties.

BACKGROUND

Mobile computing devices, such as mobile phones, have available auxiliary devices which can offer additional functionality. For example, some earbuds offer a translation experience where a user can touch one earbud, speak in a first language, and the spoken phrase is translated into a second language. The user may hear the translated phrase, for example, from speakers in the mobile computing device. Similarly, phrases spoken into the mobile phone in the second language may be translated to the first language and output through the earbuds. In circumstances where the user wants to translate speech of another person into a language the user can understand, it may be awkward to hand the other person an earbud or the mobile computing device to speak into, for example, because the mobile device is expensive and contains personally sensitive information. It may also be awkward for the user to hold the mobile computing device while the other person speaks, as the other person might begin speaking before the user has set the mobile computing device to accept the foreign language speech input. This will result in a poor translation experience.

BRIEF SUMMARY

An auxiliary device charging case is used to facilitate translation features of a mobile computing device or auxiliary device. A first user, who may be a foreign language speaker, holds the charging case and speaks into the charging case. The charging case communicates the received speech to the mobile computing device, either directly or through the auxiliary device, which translates the received speech into a second language for a second user, who is the owner of the mobile computing device and auxiliary device. The second user may provide input in the second language, such as by speaking or typing into the auxiliary or mobile computing device. The mobile computing device may translate this second input to the first language, and transmit the translated input to the charging case either directly or through the auxiliary device. The charging case may output the translated second input to the first user, such as through a speaker or display screen.

One aspect of the disclosure provides a case for an auxiliary device, including a housing adapted to store the auxiliary device therein, an input unit adapted to receive first input from a first user, a transceiver configured to wirelessly communicate the received first input with a mobile computing device, and to wirelessly receive second information from the mobile computing device, and an output configured to provide the second information to the first user. The case may further include a battery adapted to charge a battery of the auxiliary device. The auxiliary device may be, for example, a pair of earbuds. The output may be, for example, a speaker, display, or other output.

Another aspect of the disclosure provides a system for facilitating communication, the system including an auxiliary device, and a case for the auxiliary device. The case may include a housing sized to accommodate the auxiliary device, an input unit, an output unit, a wireless communication unit, a memory, and a microprocessor in communication with the memory. The microprocessor may be configured to receive, via the input unit, first input from a first user, wirelessly communicate, using the wireless communication unit, the received first input with a mobile computing device, wirelessly receive, using the wireless communication unit, second information from the mobile computing device, and provide, via the output unit, the second information to the first user.

Yet another aspect of the disclosure provides a method for facilitating communication between a first user and a second user using a case for an auxiliary device. The method includes receiving, by the case, first input from the first user, wirelessly transmitting, by the case, the received first input to a mobile computing device, receiving, by the case. second information from the mobile computing device, wherein the second information was input to the mobile computing device, and providing, by the case, the second information to the first user. According to some examples, the first input may be received in a first language, and the second information may be provided in a second language.

DETAILED DESCRIPTION

The present disclosure provides for using an auxiliary device charging case to facilitate use of translation features of a mobile computing device or auxiliary device. A first user, who may be a foreign language speaker, holds the charging case and speaks into the charging case. The charging case communicates the received speech to the mobile computing device, either directly or through the auxiliary device, which translates the received speech into a second language for a second user. The second user may be the owner of the mobile computing device and auxiliary device, and so may remain in possession of the mobile computing device and auxiliary device while the first user speaks into the charging case. Conversely, the second user may provide input in the second language, such as by speaking or typing into the auxiliary or mobile computing device. The mobile computing device may translate this second input to the first language, and transmit the translated input to the charging case either directly or through the auxiliary device. The charging case may output the translated second input to the first user, such as through a speaker or display screen.

This approach creates the illusion that translation being performed by the charging case. The owner of the auxiliary device and mobile computing device should feel more comfortable handing the case to another person who speaks a foreign language, as opposed to handing over the auxiliary device or mobile computing device, because the case has little value without the auxiliary device. The actual translation is performed by the mobile computing.

Example Systems

Figure 1:
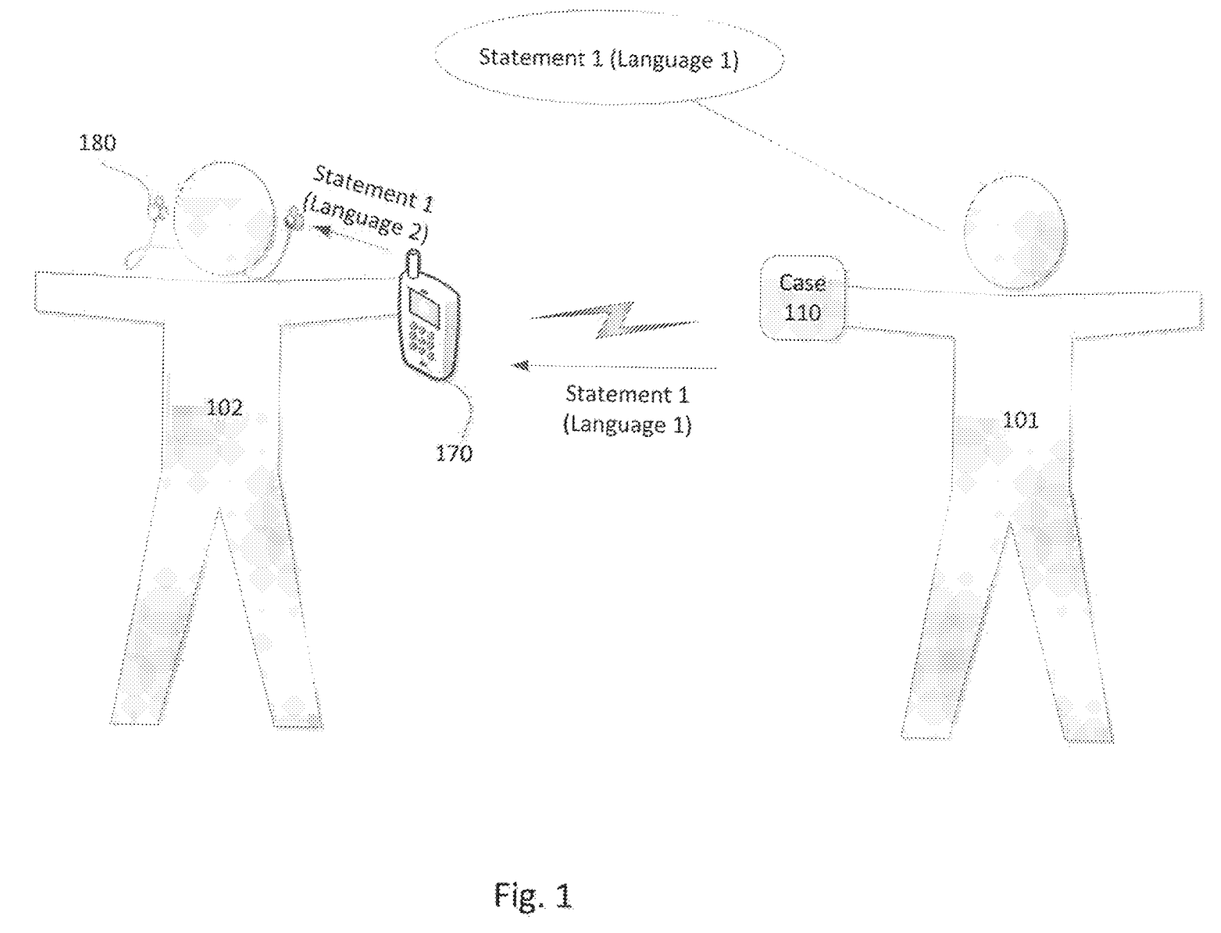
FIG. 1 is a pictorial diagram of an example system in use by two users according to aspects of the disclosure.

FIG. 1 is a pictorial diagram of an example system in use. A first user 101 holds a case 110, while second user 102 is in possession of auxiliary device 180 and mobile computing device 170. In use, the first user 101 speaks into the case 110 in a first language, and the case 110 transmits the received speech to the mobile computing device 170. The received speech may be transmitted directly to the mobile computing device 170, or may be transmitted to the auxiliary device 180 which further transmits the speech to the mobile computing device 170. The mobile computing device 170 translates the received speech into a second language, and provides the translated speech to the second user 102. For example, the mobile computing device 170 may provide the translated speech for output through the auxiliary device 180. Alternatively or additionally, the mobile computing device 170 may provide the translated speech on a display or through speakers of the mobile computing device 170.

In the example shown, the auxiliary device 180 is a pair of wireless earbuds. However, it should be understood that the auxiliary device 180 may be any of a number of different types of auxiliary devices. For example, the auxiliary device 180 may be a pair of wired earbuds, a headset, a head-mounted display, a smart watch, a mobile assistant, etc.

The case 110 may be the case for the auxiliary device 180. Accordingly, the case may include a protective housing that may be opened and closed to enable storage of the auxiliary device 180 therein. In some examples, the case may include a power source, such as a battery, for recharging the auxiliary device 180 while the auxiliary device 180 is stored in the case 110. The case 110 is also equipped with short range wireless pairing technology, such as a Bluetooth transceiver, allowing for wireless coupling with the auxiliary device 180. The case 110 may be wirelessly coupled with the auxiliary device 180 at a manufacturer prior to shipment, automatically coupled upon insertion of the auxiliary device 180 into the case 110, or manually paired by the second user 102. Further details and functions of the case 110 are described below in connection with FIGS. 2-3.

The mobile computing device 170 may be, for example, a mobile phone, tablet, laptop, gaming system, or any other type of mobile computing device. In some examples, the mobile computing device 170 may be coupled to a network, such as a cellular network, wireless Internet network, etc. Translations capabilities may be stored on the mobile computing device 70, or accessed from a remote source by the mobile computing device 170.

Though not shown in FIG. 1, the system may also be used to translate speech from the second user 102 into the first language and provide the translated speech to the first user 101. For example, speech from the second user 102 in the second language may be received at the mobile computing device 170, either directly or through the auxiliary device 180. The mobile computing device 170 may translate the received speech from the second user into the first language, and provide the translated speech in the first language to the case 110, either directly or through the auxiliary device 180.

The first user 101 may receive the translated speech as output in the first language, such as audibly through a speaker in the case 110 or in an electronic display of the case 110.

Figure 2:
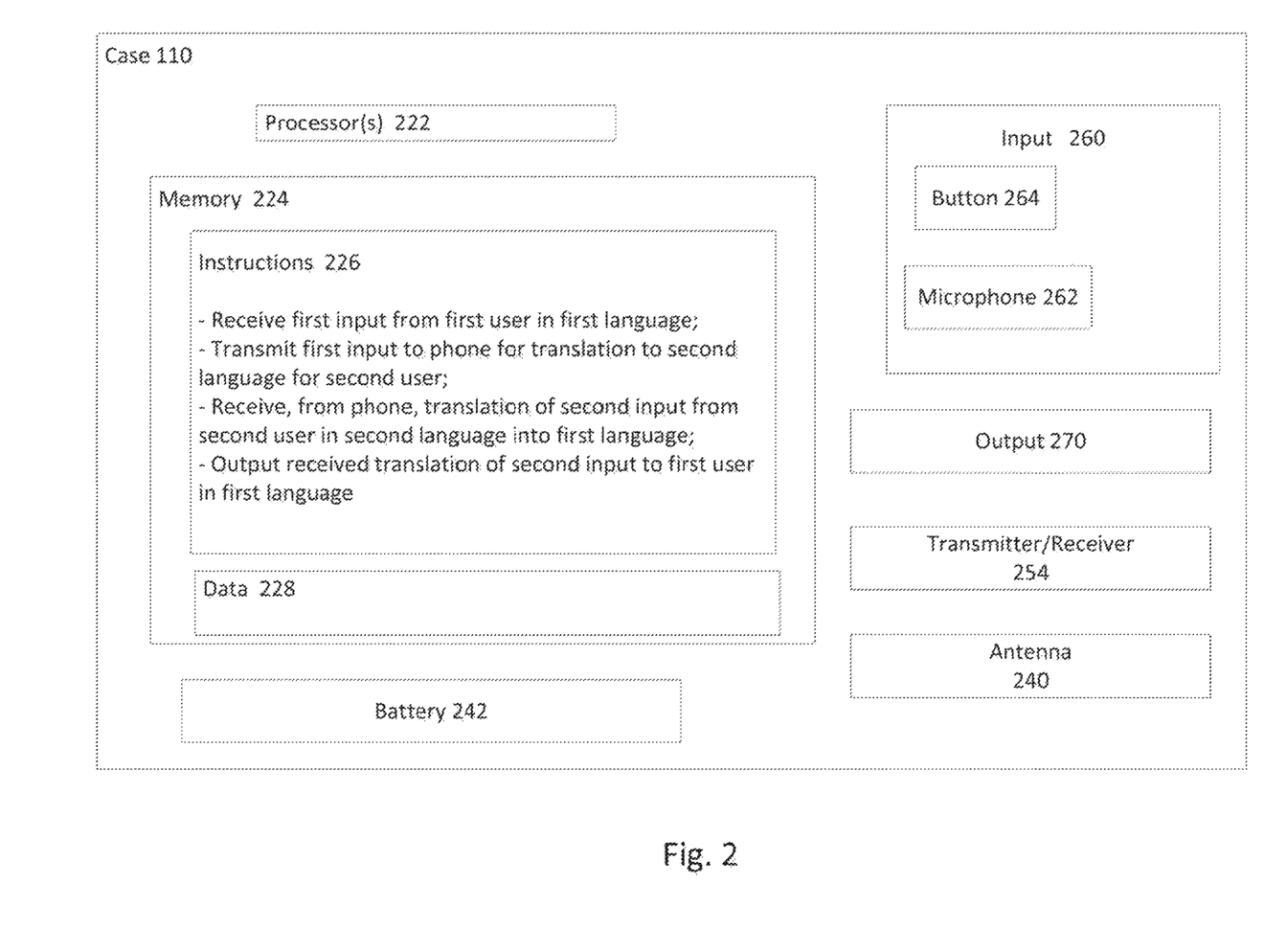
FIG. 2 is a block diagram illustrating an example device according to aspects of the disclosure.

FIG. 2 is a block diagram illustrating components of the case 110 in further detail.

FIG. 2 provides an example block diagram illustrating components of the case 110. As shown, the case 110 includes various components, such as transmitter/receiver 254, antenna 240, battery 242, input 260, output 270, etc. The case 110 further includes one or more processors 222, memory 224, and other components typically present in microprocessors, general purpose computers, or the like.

The transmitter/receiver 254 and antenna 240 enable the case 110 to wirelessly couple with another device, such as the mobile computing device 170, the auxiliary device 180, earbuds, a headset, a head-mounted display, other wearable technology devices, a phone, laptop, tablet, music player, or the like. The wireless coupling may be established using any of a variety of techniques, such as Bluetooth, Bluetooth low energy (BLE), etc.

The battery 242 may provide power to the components of the case 110. In some examples, the battery 242 may also be used to charge a battery of the auxiliary device. For example, when the auxiliary device is stored within the case 110, the auxiliary device may be charged by the battery 242. The charging may be automatic depending on one or more conditions, or may be controlled manually such as with a switch.

The input 260 and output 270 may be used to receive information from a user and provide information to the user. The input may include, for example, one or more touch sensitive inputs, such as button 264. The button 264 may be a push button, switch, toggle, touch-sensitive surface, or any other type of manual input. The input may further include a microphone 262 for accepting audio input. In some examples, the button 264 may operate in conjunction with the microphone 262. For example, the microphone 262 may be turned on to receive audio input when the button 264 is pressed. In other examples, additional buttons may be present, such as buttons for entering text or for controlling other functions, such as wireless pairing, battery charging, etc. Further, in some examples, the input 260 may provide for selection of a particular language in which the input will be provided. For example, the language can be selected from a dropdown list, entered using a particular code, automatically detected based on preliminary audio input and confirmed, etc.

The output 270 may include, for example, a speaker adapted to provide audible output to the user. The audible output may be speech translated into a language the user can understand.

The one or more processor 222 may be any conventional processors, such as commercially available microprocessors. Alternatively, the one or more processors may be a dedicated device such as an application specific integrated circuit (ASIC) or other hardware-based processor. Although FIG. 2 functionally illustrates the processor, memory, and other elements of case 110 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of case 110. Accordingly, references to a processor or computing device will be understood to include references to a collection of processors or computing devices or memories that may or may not operate in parallel.

Memory 224 may store information that is accessible by the processors 222, including instructions 226 that may be executed by the processors 222, and data 228. The memory 224 may be of a type of memory operative to store information accessible by the processors 222, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 226 and data 228 are stored on different types of media.

Data 228 may be retrieved, stored or modified by processors 222 in accordance with the instructions 226. For instance, although the present disclosure is not limited by a particular data structure, the data 228 may be stored in computer registers, in a relational database as a table having a plurality of different fields and records, XML documents, or flat files. The data 228 may also be formatted in a computer-readable format such as, but not limited to, binary values, ASCII or Unicode. By further way of example only, the data 228 may be stored as bitmaps comprised of pixels that are stored in compressed or uncompressed, or various image formats (e.g., JPEG), vector-based formats (e.g., SVG) or computer instructions for drawing graphics. Moreover, the data 228 may comprise information sufficient to identify the relevant information, such as numbers, descriptive text, proprietary codes, pointers, references to data stored in other memories (including other network locations) or information that is used by a function to calculate the relevant data.

The instructions 226 may be executed to facilitate translations performed by a mobile computing device. For example, a user holding the case 110 may enter input, such as by holding button 264 while speaking into microphone 262. The input may be transmitted to the mobile computing device for translation to a second language for a second user. The case 110 may also receive, from the mobile computing device, translation of a second input from the second user from the second language into the first language. Such received translated second input may be output to the user, for example, via output 270.

It should be understood that the device 100 may include other components which are not shown, such charging input for the battery, signals processing components, etc. Such components may also be utilized in execution of the instructions 226.

Figure 3:
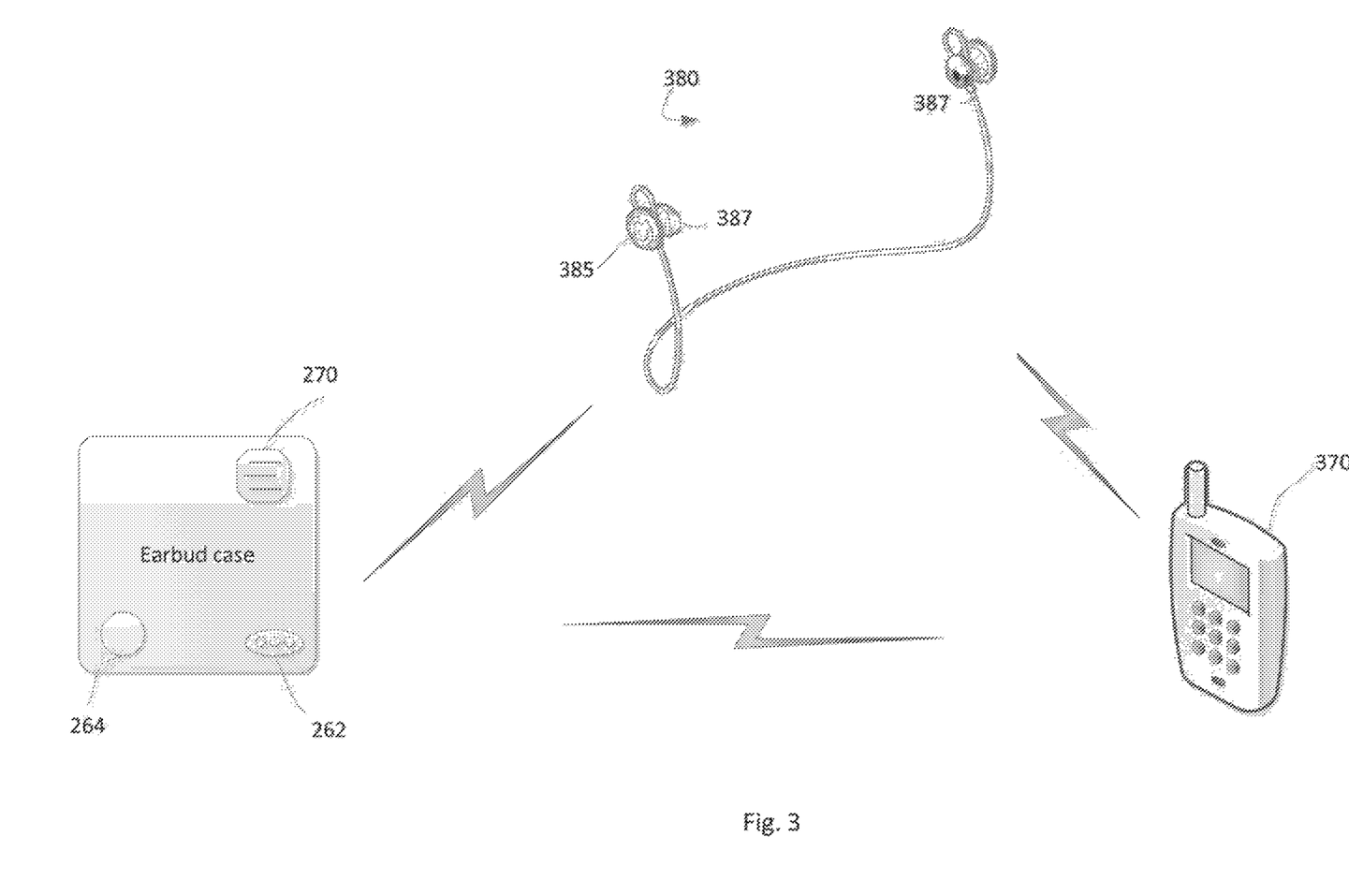
FIG. 3 is pictorial diagram of the example system of FIG. 1.

FIG. 3 is pictorial diagram of the example system including case 110, earbuds 380, and mobile device 370. Earbud case 110 includes button 264, microphone 262, and output speaker 270. Earbud case 110 is sized and shaped to store earbuds 380. The earbuds 380 may include, for example, speaker portion 387 adjacent an inner ear-engaging surface 388, and input portion 385 adjacent an outer surface. In some examples, a user may enter input by pressing the input portion 385 while speaking. The user's speech may be received by a microphone in the earbuds (not shown) or in the mobile device 370. The user may hear translated speech through the speaker portion 387.

In the example shown, each device is wirelessly connected. In particular, the case 110 is coupled to the earbuds 380, which are further coupled to the mobile device 370. In this regard, input received at the case 110 may be transmitted to the earbuds 380 and further transmitted to the mobile device 370. Likewise, information from the mobile device 370 may be passed through the earbuds 380 to the case 110 for output. The case 10 in this case is also shown as being wirelessly coupled with mobile device 370, and thus these devices may directly communicate. It should be understood, however, that the translation features discussed herein may be fully executed without a direct connection between the case 110 and the mobile device 370.

The wireless connections among the devices may be, for example, a short range pairing connection, such as Bluetooth. Other types of wireless connections are also possible.

Figure 4:
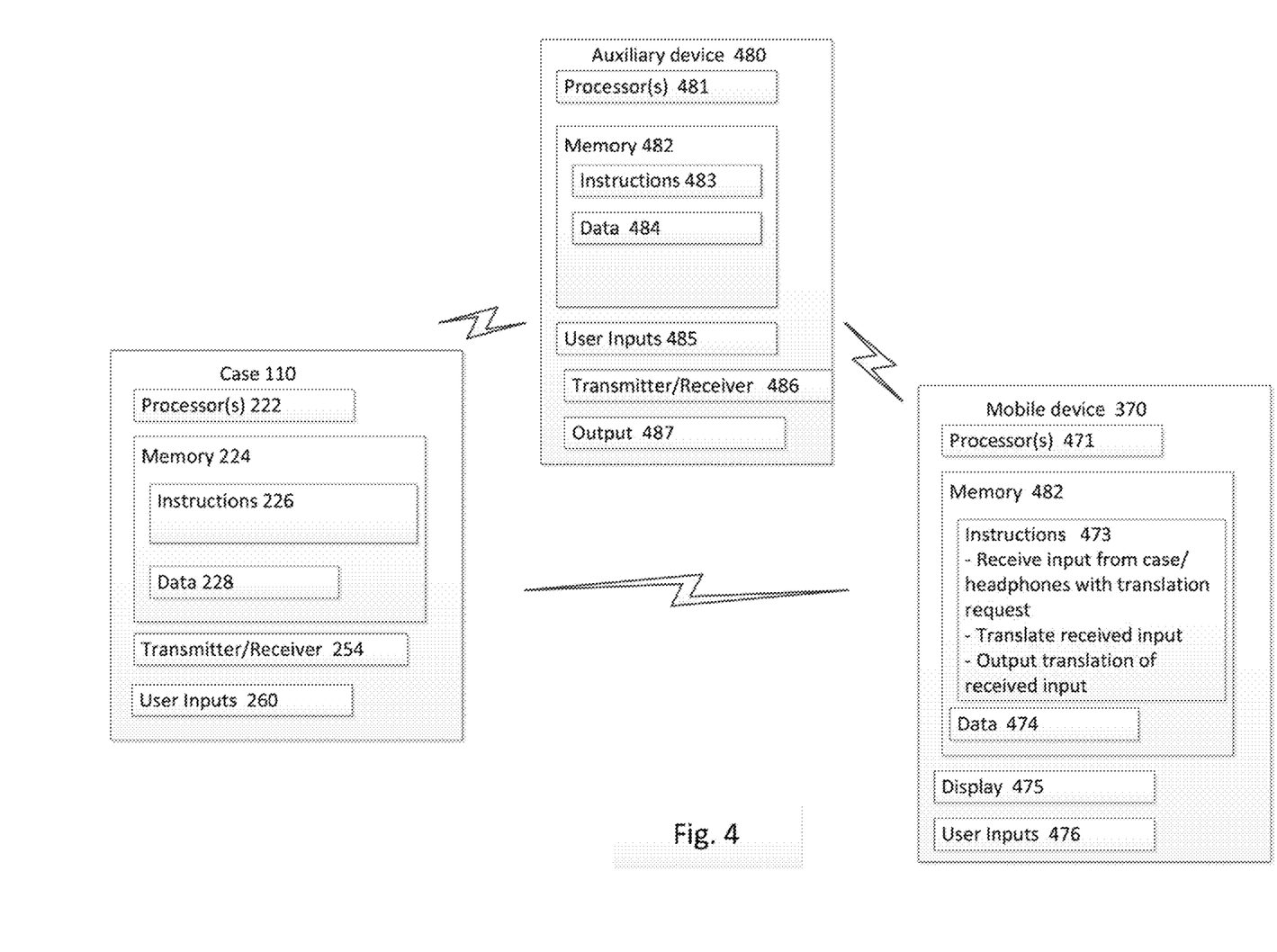
FIG. 4 is a block diagram of the example system of FIG. 3.

FIG. 4 is a block diagram of the system of FIG. 3, illustrating the internal components of the devices. While a number of such internal components are shown, it should be understood that such components are merely non-limiting examples, and that other components may additionally or alternatively be included.

Case 110 includes processor 222, memory 224 including instructions 226 and data 228, transmitter 254, and input 260, as discussed above in connection with FIG. 2.

Auxiliary device 480, such as earbuds 380 of FIG. 3, may also include one or more processors 481, memory 482 including instructions 483 and data 484, one or more user inputs 485, a transceiver 486, and output 487. The processor 481 and memory 482 may be any of a variety of different types, similar to those discussed above in connection with FIG. 2. The instructions may be executed to transmit and receive information between the case 110 and the mobile device 370, and to accept input from and provide output to a user. User input 485 may vary, for example, depending on a type of the auxiliary device 480. For example, where the auxiliary device is earbuds as discussed in connection with FIG. 3, the input may be a button or a microphone. Other types of input are possible in earbuds or other auxiliary devices. By way of example only, a head-mounted display may receive image input through an image capture device. The output 487 may similarly vary depending on a type of the device, and as such may be a speaker, display, or any other types of output.

Mobile device 370 may also include a processor 471 and memory 472, including instructions 473 and data 474. The mobile device may further include input 476, such as buttons, camera, microphone, etc., and outputs, such as display 475, speakers, vibration, etc. While a few components of the mobile device 370 are shown, it should be understood that the mobile device may include any number of additional components that are typically provided in mobile computing devices. The processor 471 and memory 472 may be any of a variety of types, similar to those discussed above in connection with the case 110 of FIG. 2. The instructions 473 may provide for receiving input from the case 110 or device 480 with a translation request. For example, the mobile device 370 may receive a block of speech input while executing an application or function for translating received speech. The mobile device 370 may translate the received input to a second language. In some examples, this may include converting the block of speech input to text, translating the text from a first language to a second language, and converting the translated text in the second language into speech. The translated speech is then output, for example, to the device 480 or the case 110.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
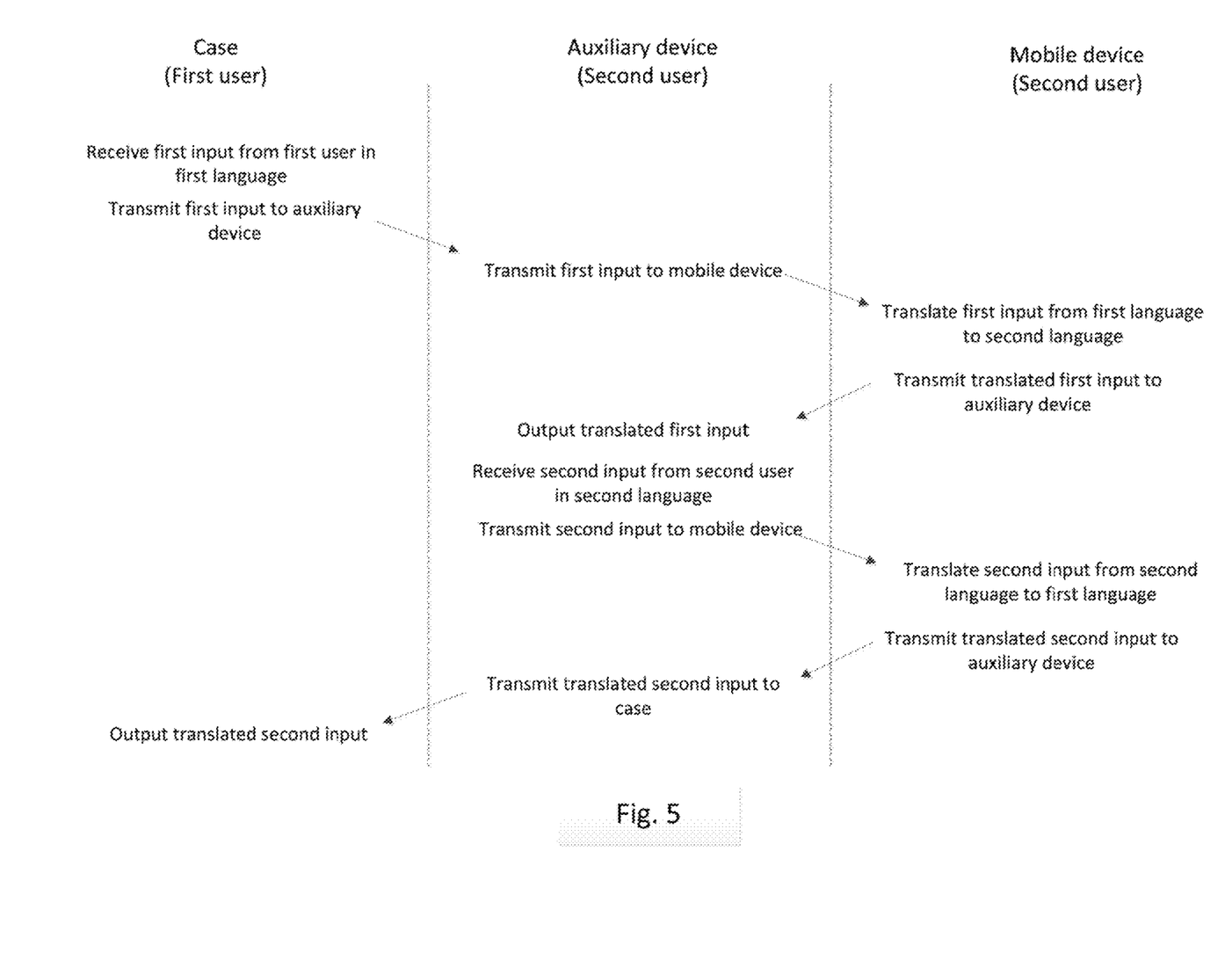
FIG. 5 is a timing diagram illustrating a first example of communication within a system according to aspects of the disclosure.

FIG. 5 is a timing diagram illustrating a first example of communication within a system including a case, auxiliary device, and mobile device. The case may be held by a first user, while the auxiliary device and mobile device remain in possession of a second user. As shown, the case receives first input from the first user in a first language and transmits the received first input to the auxiliary device. The auxiliary device in turn transmits the received first input to the mobile device for translation. The mobile device translates the first input from the first language to a second language, and transmits the translated input back to the auxiliary device. The auxiliary device outputs the translated first input to the second user. In this regard, the second user may hear what the first user said in a language the second user can understand.

The second user may want to respond to the first user. Accordingly, as shown, the auxiliary device receives a second input from the second user in the second language, and transmits the second input to the mobile device for translation. The mobile device translates the second input from the second language to the first language, and transmits the translated second input back to the auxiliary device. The auxiliary device transmits the translated second input to the case, which outputs the translated second input to the first user. The auxiliary device may also optionally output the translated second input to the second user.

Figure 6:
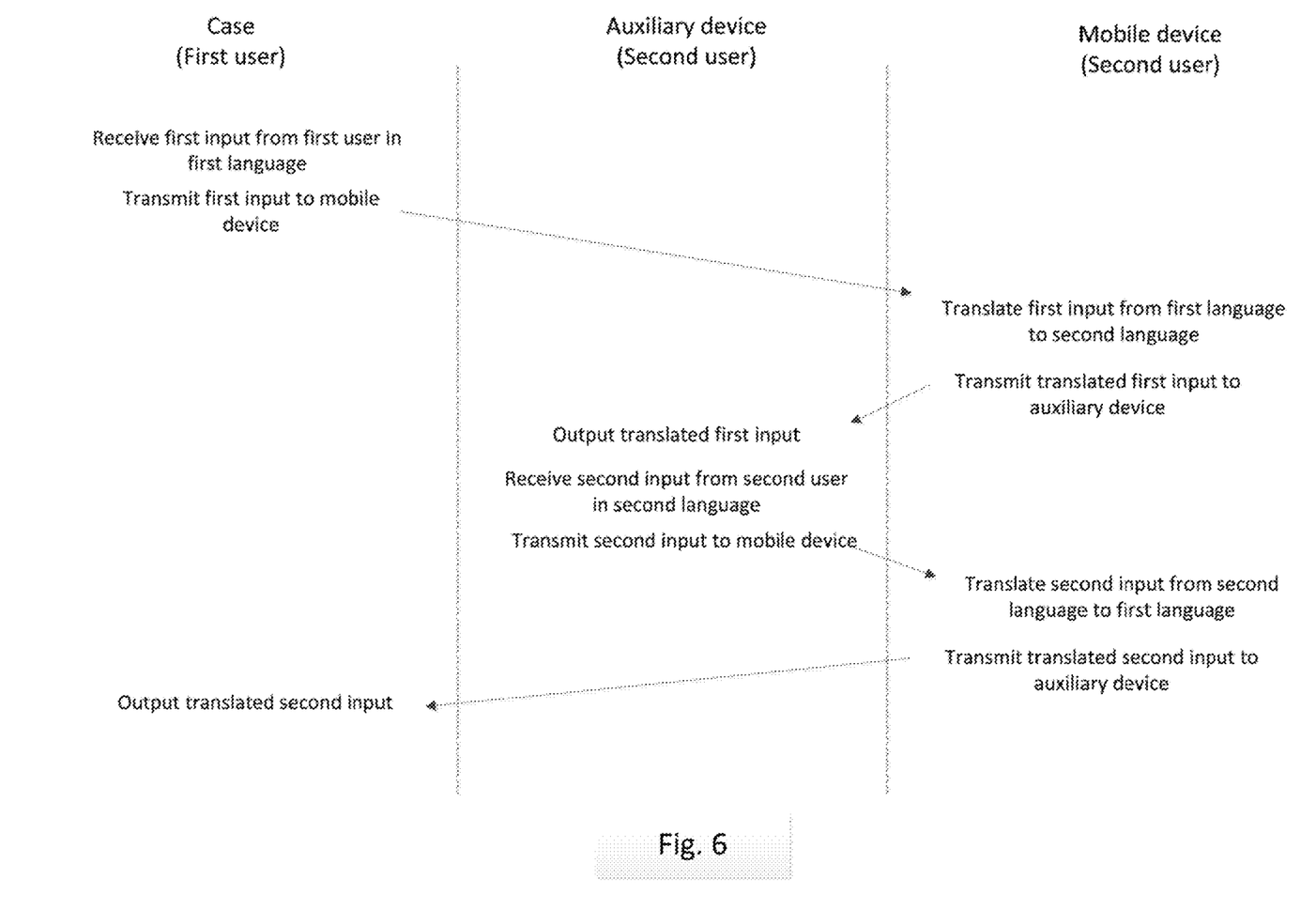
FIG. 6 is another timing diagram illustrating a second example of communication within a system according to aspects of the disclosure.

FIG. 6 is another timing diagram illustrating a second example of communication within the system. In this example, the case has a direct wireless connection with the mobile device, and thus some communications may skip over the auxiliary device. For example, the first input received from the first user in the first language is transmitted directly from the case to the mobile device, which translates the first input to the second language and transmits it to the auxiliary device for output. Similarly, second input received at the mobile device from the auxiliary device and translated to the first language is provided directly to the case for output.

Figure 7:
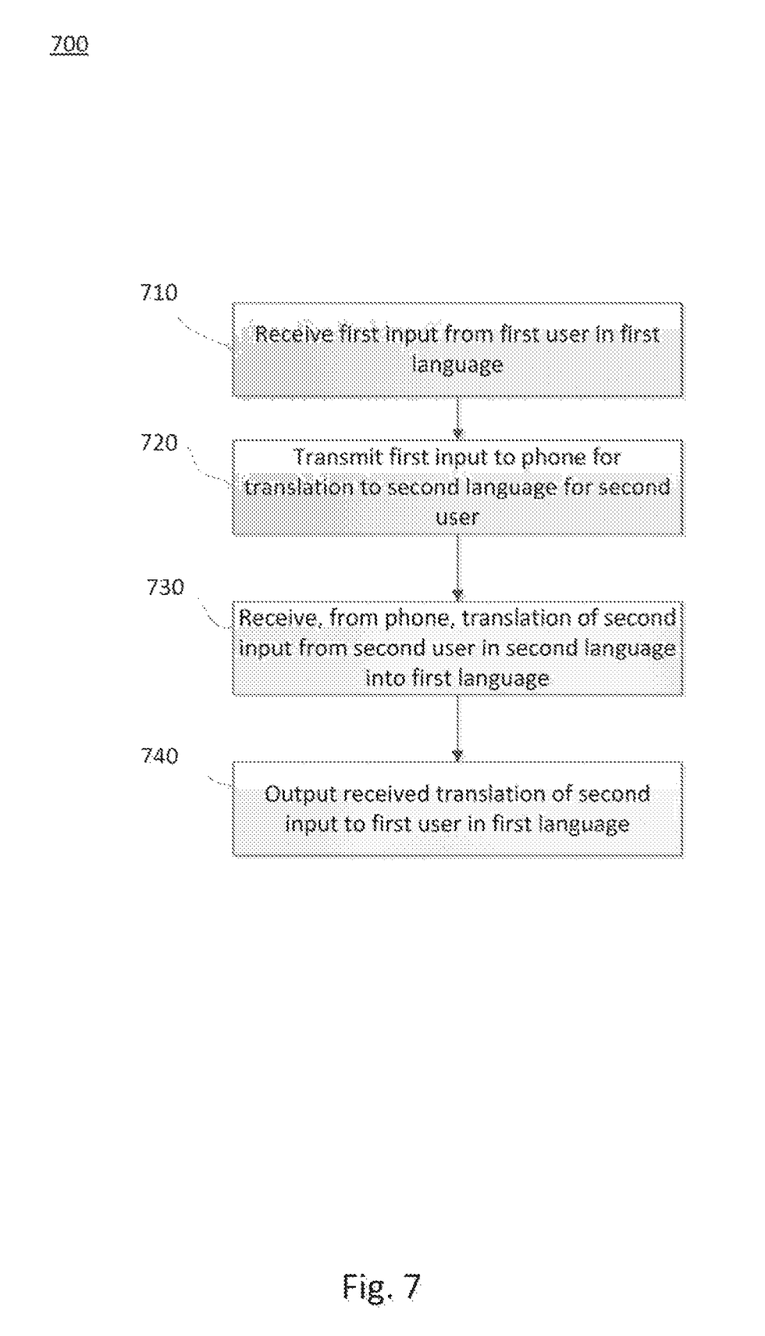
FIG. 7 is a flow diagram illustrating an example method in accordance with aspects of the disclosure.

FIG. 7 illustrates an example method 700 of using a case for an auxiliary device to facilitate translations. The method may be performed with, for example, a wireless device, such as the case 110 of FIGS. 1-4. While parts of the method are discussed in a particular order below, it should be understood that these parts may be performed in a different order. Similarly, operations may be performed simultaneously, some operations may be omitted, and other operations may be added.

In block 710, first input is received from a first user in a first language. The first user may be, for example, a foreign language speaker who is not the owner of the case, the auxiliary device, or the mobile device. However, the first user may take temporary possession of the case to facilitate the exchange of information between the first user and a second user, who is the owner of the auxiliary device and mobile device.

In block 720, the case transmits the first input to the mobile device for translation to a second language for the second user. As mentioned above, such transmission may either be direct or may be through the auxiliary device. The transmission may utilize a wireless connection, such as a short wave radio signal pairing or other wireless coupling technique.

In block 730, the case receives, from the mobile device, a translation of a second input from the second user in a second language. The received translation converts the second input into the first language, for the first user to understand. The received translation of the second input may be received directly from the mobile device, or may be received through the auxiliary device.

In block 740, the case outputs the received translation of the second input to the first user in the first language. For example, the case may emit translated speech through a speaker, or provide text on a display.

While the foregoing examples are described with respect to facilitating translations, it should be understood that the case as described may be used to facilitate other exchanges as well. The case may be used in any circumstance in which a user would like to share information with another user. For example, the case may be used to receive directions or instructions from another person, and to send those directions or instructions to the mobile device for storage. As another example, the case may be used to share a clip from an audio file of the mobile device with another person. Any of a variety of different circumstances are possible.

The foregoing systems and methods are advantageous in that they provide for a more comfortable and less socially awkward way for a user to communicate with another person who speaks another language. Because the other person speaking the other language is in control of when to enter speech for translation, a quality of the translation is kept relatively high. Moreover, the user possessing the mobile device and auxiliary device has less worry about potentially losing an item of value or unintentionally sharing personal information.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A method comprising:
receiving, by a first auxiliary device and from a second auxiliary device, a speech input comprising speech in a first language, the first auxiliary device comprising a pair of wireless earbuds and the second auxiliary device comprising a charging case configured to:
house the pair of wireless earbuds during charging; and
receive the speech input by an integrated microphone while the pair of wireless earbuds is not housed in the second auxiliary device;
wirelessly transmitting, by the first auxiliary device, the speech input to a mobile computing device;
wirelessly receiving, by the first auxiliary device and from the mobile computing device,
a translated speech data for output, the translated speech data comprising a translation of the speech input from the first language into a second language, the second language being different than the first language;
outputting, by the first auxiliary device, the translated speech data;

receiving, by the first auxiliary device, a second speech input comprising speech in the second language;

wirelessly transmitting, by the first auxiliary device, the second speech input to the mobile computing device;

receiving, by the first auxiliary device and from the mobile computing 5 device, a second translated speech data for output, the second translated speech data comprising a translation of the second speech input from the second language into the first language; and transmitting, by the first auxiliary device, the second translated speech data to the second auxiliary device for output.

2. The method of claim 1, wherein the receiving and the wireless transmitting are performed using short range wireless pairing protocols.

3. The method of claim 1, wherein the translation of the speech input from the first language into the second language is performed by a remote device in communication with the mobile computing device.

4. The method of claim 1, wherein the translated speech data is one of audio data or text data.

5. The method of claim 1, further comprising causing, by the wireless transmission, the translated speech data to be output by one or more speakers.

6. The method of claim 1, wherein the speech input is an audio input and the method further comprises:
generating a text transcription of the speech input; and
generating, by the mobile computing device, the translated speech data for output using the text transcription as the speech input.

7. A system, the system comprising:
a case for a pair of wireless earbuds, the case configured to house and charge the wireless earbuds, the case comprising:
one or more first microphones;
a first wireless communications unit;
a first memory; and
one or more first processors in communication with the first memory, the one or more first processors configured to:
receive, by the one or more first microphones, speech input comprising speech in a first language; and
transmit, by the first wireless communications unit, the speech input to the pair of wireless earbuds; and
the pair of wireless earbuds comprising:
a second wireless communication unit;
one or more second microphones;
a second memory; and
one or more second processors in communication with the second memory, the one or more second processors configured to:
receive, from the case via the second wireless communication unit, the speech input, the receipt of the speech input occurring while the pair of wireless earbuds are not housed in the case;
wirelessly transmit, by the second wireless communication unit, the speech input to a mobile device;
receive, from the mobile device, a translated speech data for output, the translated speech data comprising a translation of the speech input from the first language into a second language, the second language being different from the first language;
receive, by the one or more second microphones, a second speech input comprising speech in the second language;

wirelessly transmit, by the second wireless communications unit, the second speech input to the mobile computing device;

receive, by the second wireless communications unit and from the mobile computing device, a second translated speech data for output, the second translated speech data comprising a translation of the second speech input from the second language into the first language; and transmit, by the second wireless communications unit, the second translated speech data to the case for output.

8. The system of claim 7, wherein the second wireless communication unit comprises a transceiver and an antenna adapted for short range wireless pairing with the case or the mobile device.

9. The system of claim 7, wherein the translation of the speech input from the first language into the second language is performed by a remote device in communication with the mobile computing device.

10. The system of claim 9, wherein the communication with the remote device is over a wireless internet connection.

11. The system of claim 7, wherein the translation of the speech input from the first language into the second language is performed by an application stored in a memory of the mobile device.

12. A non-transitory, computer-readable medium storing instructions, which when executed by one or more processors cause the one or more processors to:
receive, by a first auxiliary device and from a second auxiliary device, a speech input comprising speech in a first language, the first auxiliary device comprising a pair of wireless earbuds and the second auxiliary device comprising a charging case configured to:
house the pair of wireless earbuds during charging; and
receive the speech input by an integrated microphone while the pair of wireless earbuds is not housed in the second auxiliary device;
wirelessly transmit, by the first auxiliary device, the speech input to a mobile computing device;
wirelessly receive, by the first auxiliary device and from the mobile computing device, a translated speech data for output, the translated speech data comprising a translation of the speech input from the first language into a second language, the second language being different than the first language;
output, by the first auxiliary device, the translated speech data;
receive, by the first auxiliary device, a second speech input comprising speech in the second language;
wirelessly transmit, by the first auxiliary device, the second speech input to the mobile computing device;
receive, by the first auxiliary device and from the mobile computing device, a second translated speech data for output, the second translated speech data comprising a translation of the second speech input from the second language into the first language; and
transmit, by the first auxiliary device, the second translated 5 speech data to the second auxiliary device for output.

13. The non-transitory, computer-readable medium of claim 12, wherein the translated speech data is one of audio data or text data.

14. The non-transitory, computer-readable medium of claim 12, wherein the speech input is an audio input and the one or more processors are further configured to:
generate a text transcription of the speech input; and generate the translated speech data for output using the text transcription as the speech input.

15. The non-transitory, computer-readable medium of claim 12, wherein the translation of the speech input from the first language into the second language is performed by a remote device in communication with the mobile computing device.

16. The non-transitory, computer-readable medium of claim 12, further comprising causing, by the wireless transmission, the translated speech data to be output by one or more speakers of the second first auxiliary device.

17. The non-transitory, computer-readable medium of claim 12, wherein the receiving and the transmitting are performed using short range wireless pairing protocols.

\* \* \* \* \*

UNITED STATES PATENT AND TRADEMARK OFFICE
CERTIFICATE OF CORRECTION

PATENT NO. : 12,137,331 B2  
APPLICATION NO. : 18/145695  
DATED : November 5, 2024  
INVENTOR(S) : Maksim Shmukler et al.

Page 1 of 1

It is certified that error appears in the above-identified patent and that said Letters Patent is hereby corrected as shown below:

In the Claims

Column 9, Line 6, Claim 1, after "computing" before "device", delete "5"  
Column 10, Lines 58-59, Claim 12, after "translated" before "speech", delete "5"  
Column 11, Line 11, Claim 16, after "the" before "first", delete "second"

Signed and Sealed this  
Thirty-first Day of December, 2024

Derrick Brent  
*Acting Director of the United States Patent and Trademark Office*